(12) United States Patent
Ma

(10) Patent No.: US 10,065,103 B2
(45) Date of Patent: Sep. 4, 2018

(54) SINGLE WHEEL SELF-BALANCING VEHICLE WITH TIRE PERMITTING CARVING MOTION

(71) Applicant: KOOFY INNOVATION LIMITED, Sheung Wan (CN)

(72) Inventor: Ondy Song Ki Ma, Hong Kong (CN)

(73) Assignee: KOOFY INNOVATION LIMITED, Hong Kong (CN)

( * ) Notice: Subject to any disclaimer, the term of this patent is extended or adjusted under 35 U.S.C. 154(b) by 0 days.

(21) Appl. No.: 15/895,216

(22) Filed: Feb. 13, 2018

(65) Prior Publication Data

US 2018/0169506 A1    Jun. 21, 2018

Related U.S. Application Data

(63) Continuation of application No. PCT/CN2017/090041, filed on Jun. 26, 2017.

(Continued)

(51) Int. Cl.
*A63C 17/12* (2006.01)
*A63C 17/01* (2006.01)
*A63C 17/22* (2006.01)

(52) U.S. Cl.
CPC .......... *A63C 17/011* (2013.01); *A63C 17/016* (2013.01); *A63C 17/12* (2013.01); *A63C 17/22* (2013.01)

(58) Field of Classification Search
CPC . B60C 11/03; B60C 11/0316; B60C 11/0302; A63C 17/01; A63C 17/014
See application file for complete search history.

(56) References Cited

U.S. PATENT DOCUMENTS

| 2,272,879 A | 2/1942 | Hargraves |
| 2,534,869 A | 12/1950 | Jones |

(Continued)

FOREIGN PATENT DOCUMENTS

| CN | 101462471 A | 6/2009 |
| CN | 102717669 A | 10/2013 |

(Continued)

OTHER PUBLICATIONS

Changzhou First International Trade Co., Ltd., "Latest Off Road One Wheel 10 inch Hoverboard Trotter", www.alibaba.com/product-detail/Latest-Off-Road-One-Wheel-10_60454370462. html?spm=a2700.7724857.0.0.ledbW1, retrieved Oct. 25, 2016.

(Continued)

*Primary Examiner* — John Daniel Walters
*Assistant Examiner* — James J Triggs
(74) *Attorney, Agent, or Firm* — Millman IP Inc.

(57) ABSTRACT

In an aspect, a tire for use with a single wheel, self-balancing vehicle is provided. The tire has a tire body with a tread configured for engagement with a ground surface. The tread has a lateral profile having a central region, a first lateral region tapering towards a first lateral side of the tire, and a second lateral region tapering towards a second lateral side of the tire. The lateral profile is substantially free of discontinuity. The tread has a non-directional tread groove arrangement that is asymmetrical about a central circumference line of the tire. The tire has a hardness selected to substantially prevent deformation of the first profile and the second profile during riding by a rider.

9 Claims, 7 Drawing Sheets

Related U.S. Application Data

(60) Provisional application No. 62/354,654, filed on Jun. 24, 2016.

(56) References Cited

U.S. PATENT DOCUMENTS

| | | | |
|---|---|---|---|
| 3,155,135 A | 11/1964 | Klenk | |
| D310,189 S | 8/1990 | Takakura | |
| 5,415,215 A | 5/1995 | Covert et al. | |
| 5,660,652 A | 8/1997 | Young et al. | |
| 9,598,141 B1 * | 3/2017 | Doerksen | B62M 7/12 |
| D815,228 S * | 4/2018 | Ma | D21/765 |
| 2010/0218865 A1 | 9/2010 | Kim | |
| 2016/0136508 A1 * | 5/2016 | Bigler | A63C 17/014 180/181 |
| 2017/0349230 A1 * | 12/2017 | Doerksen | B62K 11/007 |

FOREIGN PATENT DOCUMENTS

| | | |
|---|---|---|
| CN | 102717669 B | 7/2014 |
| CN | 204017335 U | 12/2014 |
| CN | 104943477 A | 9/2015 |
| WO | 2007086635 A1 | 8/2004 |

OTHER PUBLICATIONS

Hoverboard Technologies, www.hoverboard.com, retrieved Oct. 25, 2016.

Onewheel, Future Motion Inc., www.onewheel.com, retrieved Oct. 25, 2016.

ShenZhen SameZone Hi-Tech CO.,LTD, "Combine 2 wheel electric standing unicycle scooter,one wheel skateboard", www.aliexpress.com/item/combine-2-wheel-electric-standing-unicycle-scooter-one-wheel-skateboard/1000001694805.html?spm=2114.40010308.4.2.6MmLyZ, retrieved Oct. 25, 2016.

PCT/CN2017/090041, International Search Report & Written Opinion, dated Sep. 20, 2017, Chinese State Intellectual Property Office.

* cited by examiner

SINGLE WHEEL SELF-BALANCING VEHICLE WITH TIRE PERMITTING CARVING MOTION

CROSS-REFERENCE TO RELATED APPLICATIONS

This application is a continuation of, and claims the benefit of PCT/CN2017/090041, filed on Jun. 26, 2017, which claims the benefit of U.S. Provisional Patent Application No. 62/354,654, filed on Jun. 24, 2016, the contents of which are incorporated herein by reference in their entirety

FIELD OF THE INVENTION

The present invention relates generally to tires, and, in particular, to a tire for a single wheel self-balancing vehicle.

BACKGROUND OF THE DISCLOSURE

Single wheel, self-balancing boards are known. Such vehicles permit a rider to stand thereon to travel across generally flat surfaces. FIG. 1 shows such a single wheel, self-balancing board 20. The single wheel, self-balancing board 20 has a platform 24 that includes a pair of foot deck surfaces 28 at its longitudinal ends that are bridged by a pair of lateral frame members 32 extending along the lateral sides of the platform 24. The foot deck surfaces 28 and the lateral frame members 32 define a wheel opening 36 between them. A wheel assembly 40 is positioned in the wheel opening 36 and secured to the lateral frame members 32 via an axle. A motor of the wheel assembly 40 is coupled to the axle and drives a tire 44 to rotate clockwise or counter-clockwise around the axle. A controller controls the motor to maintain the platform 24 generally level horizontally in response to data from sensors.

The tire 44 is pneumatic, providing an air cushion for dampening impact forces, and has a central circumferential surface 48 that has a uniform, generally smooth tread that is free of grooves. The generally smooth central circumferential surface 48 extends laterally to meet two beveled lateral circumferential portions 52 at the circumferential edges 56. The beveled lateral circumferential surfaces 52 extend to the sidewalls 60 of the tire 44.

FIG. 2A shows the tire 44 in contact with a generally flat travel surface 64 when a rider's weight is evenly distributed laterally across the platform 24 of the single wheel, self-balancing board 20. As a result of the laterally evenly distributed weight of the rider, deformation of the tire 44 is generally even across its lateral dimension, resulting in a contact patch 68 with the travel surface 64 that spans the lateral width of the central circumferential surface 48. Traction between the tire 44 and the travel surface 64 provides resistance to travel of the single wheel, self-balancing board 20 in a direction other than those orthogonal to the central circumferential surface 48 of the tire 44.

A rider standing on the platform 24 can cause the single wheel, self-balancing board 20 to change travel direction by shifting their weight to a lateral side of the platform 24, causing the corresponding lateral side of the tire 44 to be compressed.

FIG. 2B shows the tire 44 of the single wheel, self-balancing board 20 in contact with the generally flat travel surface 64 with a rider's weight shifted to a lateral side of the platform 24 of the single wheel, self-balancing board 20. The pneumatic tire 44 compresses and deforms on the lateral side to which weight has been shifted, leading to a reduction in size of a contact patch 68' between a lateral portion of the central circumferential surface 48 and the travel surface 64. Further, the deformation causes a reduction in the effective profile of the pneumatic tire 44 so that it becomes effectively tapered towards its lateral sides (i.e., frustoconical), thus enabling travel in a direction that is not perpendicular to the rotation axis of the pneumatic tire 44. The sidewall 60 on the lateral side of the tire 44 to which weight has been shifted is deformed but has a natural tendency return to its original shape as shown in FIG. 2A due to a restoring force in the side wall of the tire 44. As a result, if the rider desires to experience a 'carving' motion as they would on a snowboard or surfboard, they must continually counter this restoring force F while leaning to one lateral side of the platform 24. As will be appreciated, the effort of the rider to maintain weight shifted to one lateral side of the platform 24 to counter the lateral centering force F can make smooth changes in direction of the single wheel, self-balancing board 20 difficult.

Further shifting weight to one lateral side of the platform 24 by the rider further reduces the size of the contact patch 68' between the tire 44 and the travel surface 64 to a region of the central circumferential surface 48 of the tire 44 adjacent the circumferential edge 56 on the lateral side of the platform 24 to which weight has been shifted. As the contact patch 68' between the tire 44 and the travel surface 64 is reduced, the rider can cause the single wheel, self-balancing board 20 to change directions more readily by continued shifting of their weight to the lateral side of the platform 24 or by relative shifting of one of their feet resting on the foot deck surfaces 28a, 28b to reorient the platform in a different direction. As will be understood, however, the centering force F increases as the weight shift increases.

SUMMARY OF THE DISCLOSURE

According to an aspect, there is provided a tire for use with a single wheel, self-balancing vehicle, comprising a first lateral region having a first profile free of discontinuities and tapering towards a first lateral side of the tire, a second lateral region having a second profile tapering free of discontinuities towards a second lateral side of the tire, and a non-directional tread groove arrangement that is asymmetrical about a central circumference line of the tire, wherein the tire has a hardness selected to substantially prevent deformation of the first profile and the second profile.

The tread groove arrangement can comprise a first pattern of grooves on one side of and adjacent the central circumference line and a second pattern of grooves on another side of and adjacent the central circumference line. The breaks comprise grooves extending generally laterally from the central circumference line.

The tire can be free of ridges extending continuously around a circumference of the tire.

The tread groove arrangement can comprise at least one circumferential groove.

The tire can further comprise a central region between the first lateral region and the second lateral region and having a generally flat profile.

The central region can have a width of at least 25 percent of a lateral width of the tire.

The tire can be solid.

The tire can be comprised of a rubber.

The tire can have a hardness of at least about Shore 58 A under the rubber durometer scale. In some embodiments, the tire can have a hardness of as little as Shore 56 A durometer. In some embodiments, the tire can have a hardness of Shore 60 A durometer.

According to another aspect, there is provided a tire for use with a single wheel, self-balancing vehicle, comprising a first lateral region having a first profile free of discontinuities and tapering towards a first lateral side of the tire, a second lateral region having a second profile tapering free of discontinuities towards a second lateral side of the tire, and a non-directional tread groove arrangement that is asymmetrical about a central circumference line of the tire.

The tread groove arrangement can comprise a first pattern of grooves on one side of and adjacent the central circumference line and a second pattern of grooves on another side of and adjacent the central circumference line. The breaks comprise grooves extending generally laterally from the central circumference line.

The tire can be free of ridges extending continuously around a circumference of the tire.

The tread groove arrangement can comprise at least one circumferential groove.

The tire can further comprise a central region between the first lateral region and the second lateral region and having a generally flat profile.

The central region can have a width of at least 25 percent of a lateral width of the tire.

The tire can be solid.

The tire can be comprised of a rubber.

The tire can have a hardness of at least about Shore 58 A under the rubber durometer scale. In some embodiments, the tire can have a hardness of as little as Shore 56 A durometer. In some embodiments, the tire can have a hardness of Shore 60 A durometer.

In another aspect, a tire for use with a single wheel, self-balancing vehicle is provided. The tire has a tire body with a tread configured for engagement with a ground surface. The tread has a lateral profile having a central region, a first lateral region tapering towards a first lateral side of the tire, and a second lateral region tapering towards a second lateral side of the tire, wherein the lateral profile is substantially free of discontinuity. The tread has a non-directional tread groove arrangement that is asymmetrical about a central circumference line of the tire. The tire has a hardness selected to substantially prevent deformation of the first profile and the second profile during riding by a rider.

In yet another aspect, a single wheel, self-balancing vehicle is provided and includes a platform for supporting a standing rider and a motorized wheel assembly that is rotationally coupled to the platform and is powered to transport a rider standing on the platform along a ground surface. The motorized wheel assembly includes a tire that has a tire body with a tread configured for engagement with the ground surface. The tread has a lateral profile having a central region, a first lateral region tapering towards a first lateral side of the tire, and a second lateral region tapering towards a second lateral side of the tire. The lateral profile is substantially free of discontinuity. The tread has a non-directional tread groove arrangement that is asymmetrical about a central circumference line of the tire. The tire has a hardness selected to substantially prevent deformation of the first profile and the second profile during riding by a rider.

BRIEF DESCRIPTION OF THE DRAWINGS

Embodiments will now be described, by way of example only, with reference to the attached Figures, wherein.

DETAILED DESCRIPTION OF THE EMBODIMENTS

Figure 1:
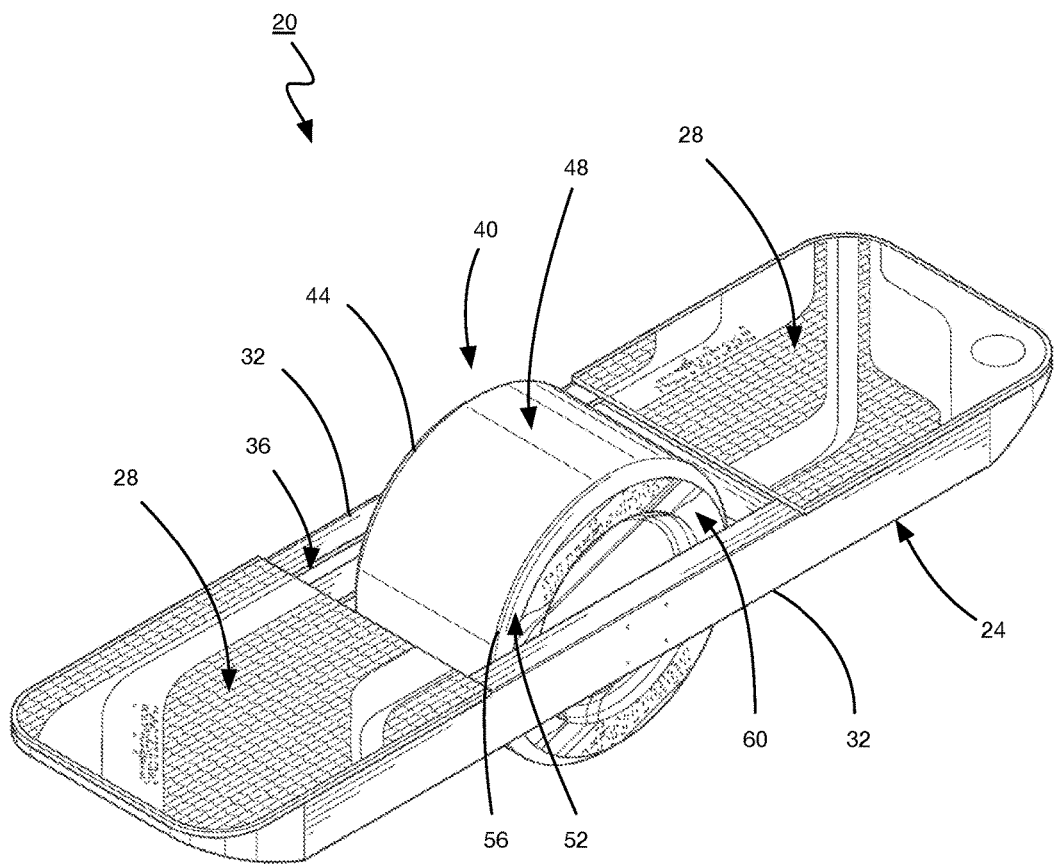
FIG. 1 is a side perspective view of a single wheel, self-balancing board employing a prior art tire.
Figure 2A:
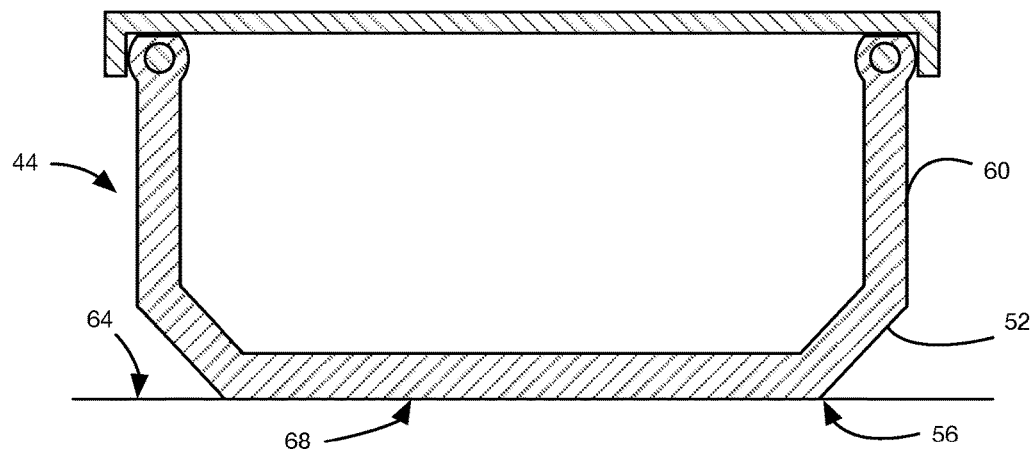
FIG. 2A is a front sectional view of the tire of the single wheel, self-balancing board of FIG. 1 in contact with a travel surface with a rider's weight evenly distributed between lateral sides of the platform of the single wheel, self-balancing board of FIG. 1.
Figure 2B:
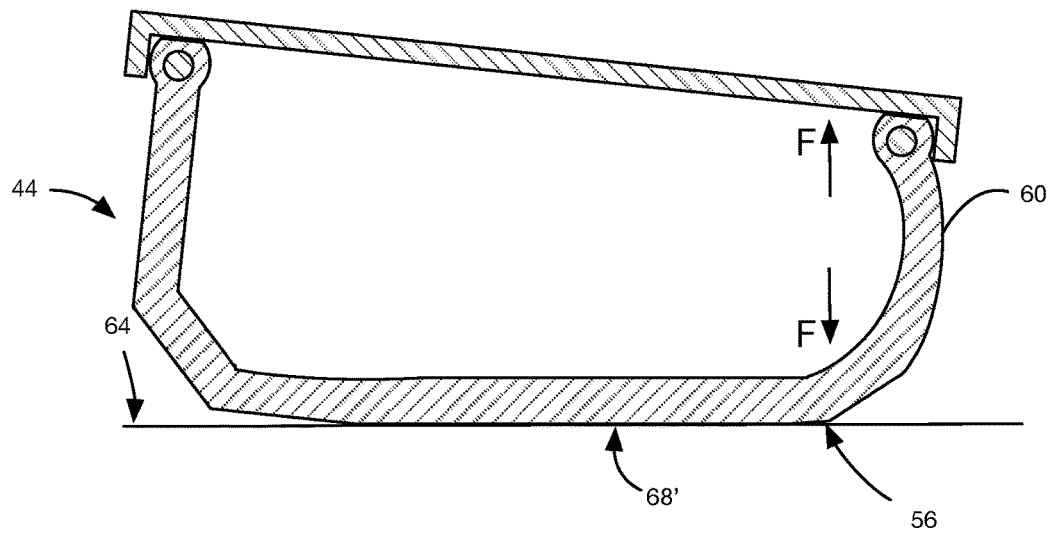
FIG. 2B is a front sectional view of the tire of the single wheel, self-balancing board of FIG. 1 in contact with a travel surface with a rider's weight shifted to a lateral side of the platform of the single wheel, self-balancing board of FIG. 1.
Figure 3A:
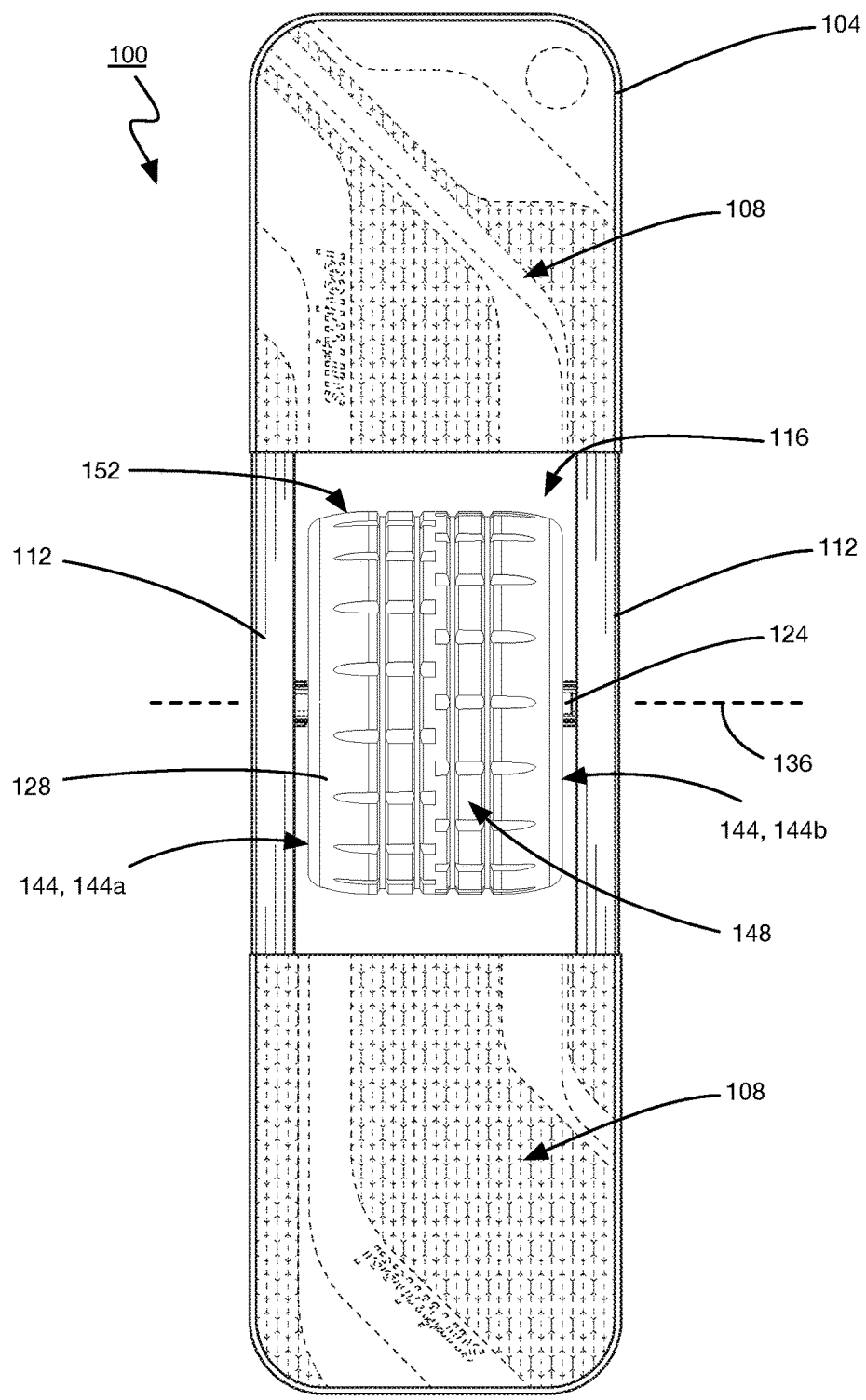
FIG. 3A shows a top view of a single wheel, self-balancing board employing a tire in accordance with an embodiment.
Figure 3B:
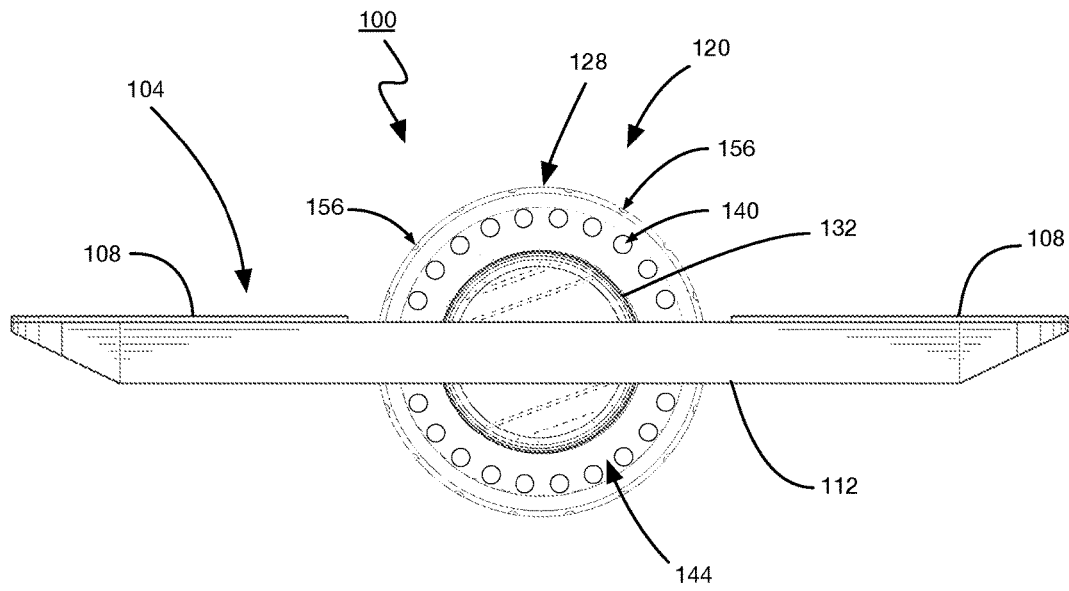
FIG. 3B shows a side view of the single wheel, self-balancing board of FIG. 3A.
Figure 7:
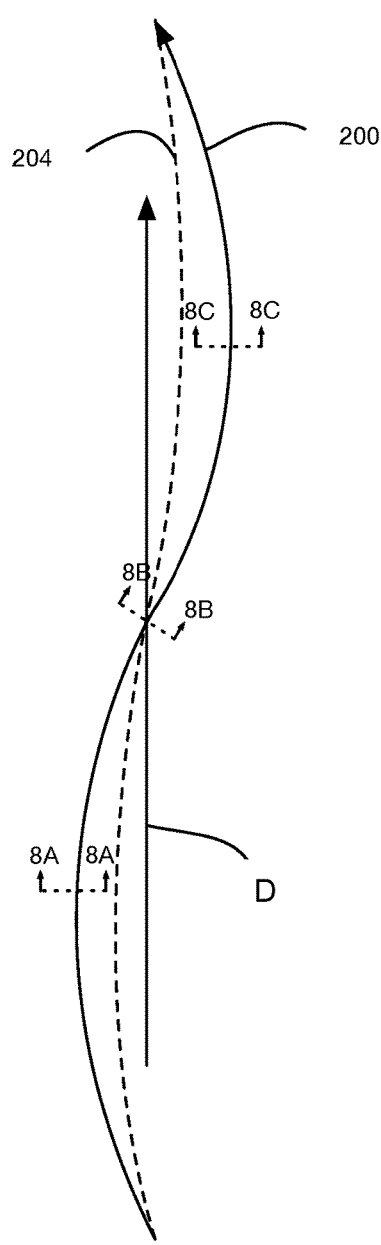
FIG. 7 illustrates a top view of a travel path of the single wheel, self-balancing board of FIG. 3A.

FIGS. 3A and 3B show a single wheel, self-balancing vehicle 100 employing a tire in accordance with an embodiment of the present disclosure. The vehicle 100 facilitates riding in a carving motion as shown in FIG. 7, similar to that performed on a snowboard or surfboard. The single wheel, self-balancing vehicle 100 has a platform 104 that has a pair of foot deck surfaces 108 that are bridged by a pair of lateral frame members 112. The foot deck surfaces 108 and the lateral frame members 112 define a wheel opening 116. A motorized wheel assembly 120 is rotationally coupled to the platform 104 and is powered to transport a rider standing on the platform along a ground surface. The wheel assembly 120 is positioned in the wheel opening 116 and secured to the lateral frame members 112 by an axle 124 that spans the lateral frame members 112. The wheel assembly 120 has a tire 128 that is mounted on a motorized hub 132. The axle 124 defines a rotation axis 136 for the tire 128.

A set of laterally extending cylindrical through holes 140 extend directly laterally through the width of the tire 128 between opposite lateral sides 144a, 144b (collectively, lateral sides 144) through the tire 128. The cylindrical through holes 140 reduce the weight of the tire 128 without significantly compromising its resistance to deformation.

The tire 128 has a tread 148 having a tread groove arrangement 152 formed thereon.

Figure 5:
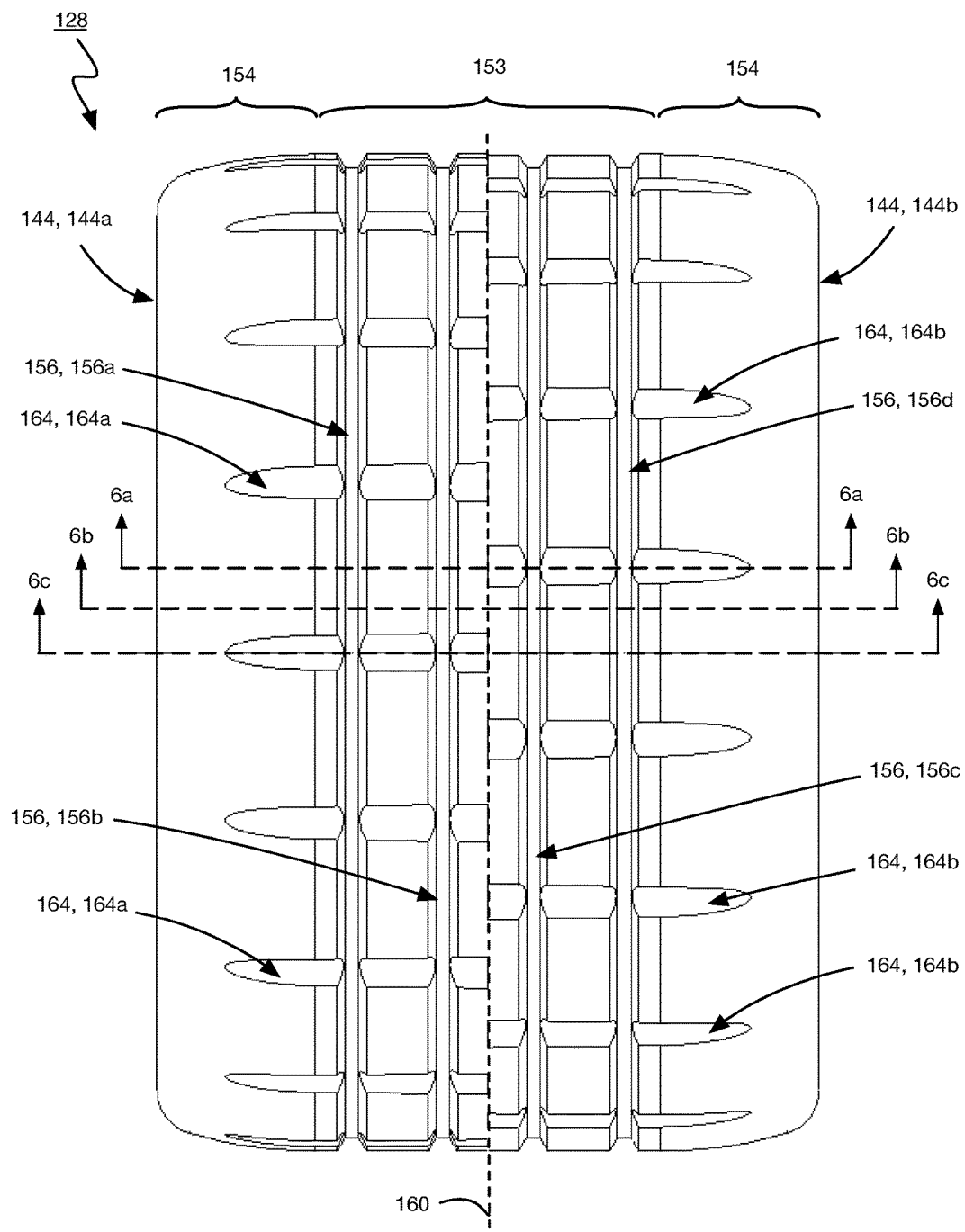
FIG. 5 shows a top view of the tire of FIG. 3A.

As shown in FIG. 5, the tread 148 has a central region 153 that may have a generally flat lateral profile; that is, all lateral points of the central region 153 are generally radially equidistant from the rotation axis 136. When the platform 104 and a travel surface upon which it is positioned are level horizontally, the contact patch between the tire 128 and the travel surface 64 extends the width of the central region 153.

Two lateral regions 154 of the tread 148 extend and taper smoothly from the central region 153 towards the lateral sides 144 of the tire 128.

Figure 4:
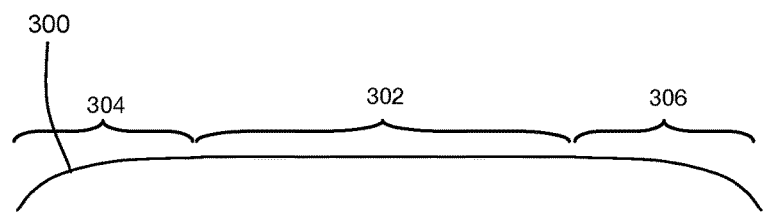
FIG. 4 is a lateral profile of a tread of the single wheel from the single wheel, self-balancing board of FIG. 3A.

As a result of the above, the tread 148 has a lateral profile shown at 300 in FIG. 4, including a central region 302 and first and second lateral regions 304 and 306. The first lateral region 304 tapers towards a first lateral side of the tire 128, and the second lateral region 306 tapers towards a second lateral side of the tire 128. The lateral profile 300 is substantially free of discontinuity. This means that, along the lateral profile, there are no points of discontinuous slope change. A corollary to this statement is that there is no discontinuity at the transition between the central region 302 of the lateral profile and each of the two lateral regions 304 and 306.

The width of the central region 153 may be about 46 percent of the lateral width of the tire 128 (shown at W in FIG. 6A), and the width of each of the lateral regions 154 is about 32 percent of the lateral width of the tire 128. The width of the central region 153 of the tread 148 corresponds to the width of the central region 302 of the lateral profile 300. Similarly, the widths of the lateral regions 154 of the tread 148 corresponds to the width of the lateral regions 304 and 306 of the lateral profile 300. The width of the central regions (i.e. regions 153, 302), can be varied relative to the widths of the lateral regions (i.e. regions 154, 304, 306). For example, in some embodiments, it can be desirable to have the width of the central region 153 be about 25 percent of the tire 128, or greater in some embodiments.

The generally flat central region 153 facilitates straight-ahead travel of the tire 128 when weight is generally evenly distributed between lateral sides of the platform 104 by a rider, so as to maintain a generally level lateral orientation of the platform 104 as shown in FIG. 3B.

Providing a lateral profile without discontinuities enables a rider to smoothly transition between travel on the central region 153 and the lateral regions 154 without an abrupt change in the lateral angle of the vehicle 100. Such abrupt changes in some boards of the prior art can render the boards difficult to control and particularly difficult to ride in a carving motion, as shown in FIG. 7.

As shown in FIGS. 5 and 6A-6C, the tread groove arrangement 152 has a set of four continuous circumferential grooves 156a, 156b, 156c, and 156d (collectively referred to as circumferential grooves 156) that are spaced from a central circumference line 160 that is equidistant from the lateral sides 144 of the tire 128.

Further, the tread groove arrangement 152 is asymmetrical about the central circumference line 160. That is, the tread groove arrangement 152 on one side of the central circumference line 160 does not mirror the tread groove arrangement 152 on the opposing side of the central circumference line 160. In particular, the tread groove arrangement 152 on one side of the central circumference line 160 has a first pattern of grooves adjacent the central circumference line 160 that is out of alignment with a second pattern of grooves adjacent the central circumference line 160 in the tread groove arrangement 152 on the opposing side of the central circumference line 160. As a result, the tire 128 does not have a central ridge.

In the example shown, the first pattern of grooves is made up of a first set of lateral grooves 164a that are spaced around the circumference of the tire 128 and extend from the central circumference line 160 towards the lateral side 144a in combination with the circumferential grooves 156a and 156b. In the example embodiment shown in FIG. 5, the first set of lateral grooves 164a are spaced at 14.4 degree intervals around the circumference of the tire 128 relative to the rotation axis 136.

In the example shown, the second pattern of grooves is made up of a second set of lateral grooves 164b that are spaced around the circumference of the tire 128 and extend from the central circumference line 160 towards the other lateral side 144b in combination with the circumferential grooves 156a and 156b. The second set of lateral grooves 164b may also be spaced at 14.4 degree intervals around the circumference of the tire 128 relative to the rotation axis 136, but are off-phase about the circumference of the tire 128 relative to the first set of lateral grooves 164a. As a result, the lateral grooves 164a, 164b provide breaks adjacent the central circumference line 160 of the tire 128 on alternating sides of the central circumference line 160 about the circumference of the tire 128.

In the example embodiment shown, the lateral grooves 164a and 164b extend solely laterally. However there are other arrangements of grooves that would provide the desired performance characteristics of the vehicle 100.

Figure 6A:
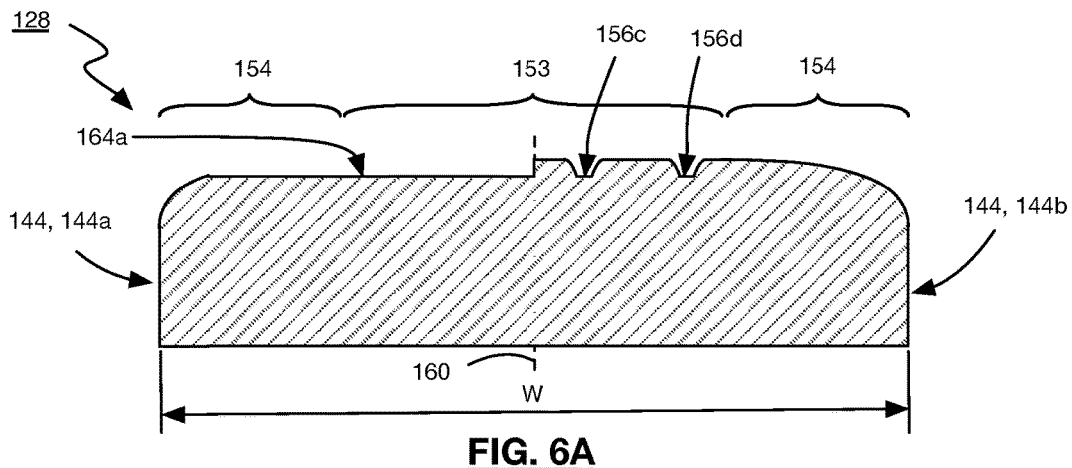
FIG. 6A is a sectional view along line 6A-6A of FIG. 5.

FIG. 6A shows a cross section of a portion of tire 128 along line 6A-6A of FIG. 5. Line 6A-6A coincides with one of the lateral grooves 164a extending from the central circumference line 160 towards the lateral side 144a, and does not coincide with one of the lateral grooves 164b extending from the central circumference line 160 towards the lateral side 144b.

Figure 6B:
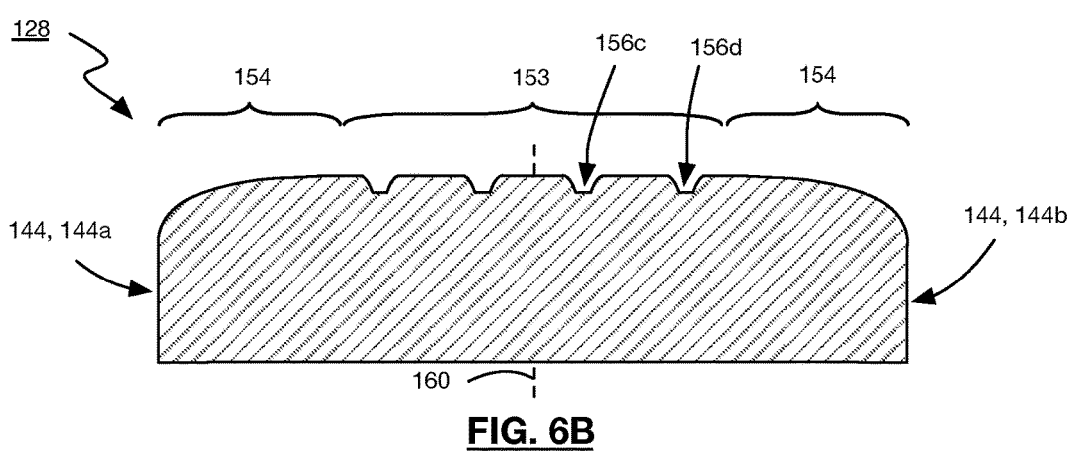
FIG. 6B is a sectional view along line 6B-6B of FIG. 5.

FIG. 6B shows a cross section of a portion of tire 128 along line 6B-6B of FIG. 5. Line 6B-6B does not coincide with any of the lateral grooves 164a or the lateral grooves 164b.

Figure 6C:
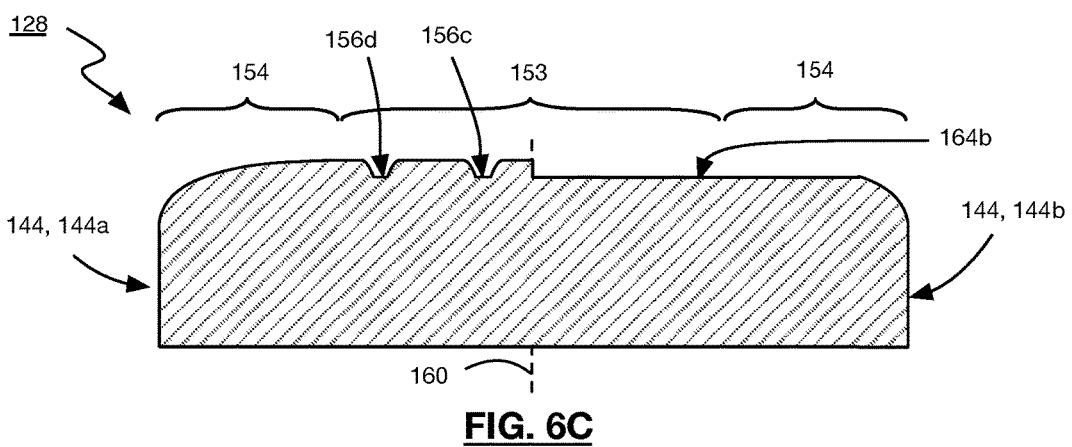
FIG. 6C is a sectional view along line 6C-6C of FIG. 5.

FIG. 6C shows a cross section of a portion of tire 128 along line 6C-6C of FIG. 5. Line 6C-6C coincides with one of the lateral grooves 164b extending from the central circumference line 160 towards the lateral side 144b, and does not coincide with one of the lateral grooves 164a extending from the central circumference line 160 towards the lateral side 144a.

The asymmetry in the tread groove arrangement 152 about the central circumference line 160 permits generally stable motion of the tire 128 in straight-ahead motion, but facilitates leaning the tire 128 to lift off from the central region 15e of the tread 148 and to lean on either of the lateral regions 154 of the tread 148. As a result, when a rider's weight is shifted to one lateral side of the platform 104 and the corresponding lateral region 154 is in contact with a generally flat travel surface, shifting of the rider's weight to the opposite lateral side of the platform 104 causes the single wheel, self-balancing vehicle 100 to be transition smoothly from an orientation in which it leans to one side through an orientation where it is generally level, to an orientation in which it leans to the other side.

Additionally, it can be seen that the tread groove arrangement 152 is non-directional; that is, the tread groove arrangement 152 is not a directional tread groove arrangement.

Directional tread groove arrangements can be undesirable as they have been found to possess generally undesirable turning characteristics when attempting to generate a 'carving' motion during operation of the one-wheeled vehicle 100.

Further, the tire 128 is resistant to compression so that deformation of the profile of the tire 128 is substantially prevented for a given weight of rider. In the example embodiment shown, the tire 128 may be a solid (non-pneumatic) tire, made from any suitable material such as a suitable rubber. The tire 128 has a hardness that is selected to substantially prevent deformation of the profiles of the lateral regions 154 when the rider is riding on either of them. The aforementioned feature of substantially preventing deformation may be defined specifically to mean that deformation is substantially prevented when the vehicle 100 is ridden by a rider who weighs at least 110 pounds. Substantially preventing deformation may mean, in at least some embodiments, that any overall dimension associated with the tire 128 (e.g. overall width, overall side wall height). does not change by more than 10 percent when the board is being ridden by the aforementioned rider of at least 110 pounds. Depending on the application substantially preventing deformation may mean that any dimension associated with the tire 128 does not change by more than 5 percent. Depending on the application substantially preventing deformation may mean that any dimension associated with the tire 128 does not change by more than 5 percent when being ridden by the aforementioned rider. In other embodiments, a different percentage of deformation that is greater than 10 percent or less than 5 percent may be acceptable.

The cylindrical through holes 140 do not significantly impact the compressibility/deformation of the tire 128. In one scenario, it has been found that a suitable rubber or rubber compound having a hardness of at least about Shore 58 A under the rubber durometer scale provides a desirable resistance to deformation for the tire 128 for riders up to about 155 pounds. In other embodiments, the hardness of the tire 128 may be selected to be sufficient to substantially prevent deformation for a rider of, for example, at least 110 pounds. The appropriate hardness of the rubber of a tire can vary based on the dimensions and design of the wheel, the weight of the rider, and other parameters. and can be determined through experimentation. In some embodiments, the tire can have a hardness of as little as Shore 56 A durometer. In some embodiments, the tire can have a hardness of Shore 60 A durometer.

The tire 128 permits the vehicle 100 to be ridden in a carving motion so as to provide a surfing- or snowboarding-like experience for the rider. The motion illustrated by the path shown FIG. 7 is not simply achieved by steering the front of the vehicle 100 so that its longitudinal axis is pushed or pulled by the rider directly laterally. The exemplary travel path 200 shown in FIG. 7 is achieved while the rider is generally leaning but is oriented generally such that their sagittal plane is parallel to the general direction of travel shown at D in FIG. 7 of the single wheel, self-balancing vehicle 100. As shown, the travel path 200 swings left, then right, then back to an intermediate position.

Figure 8C:
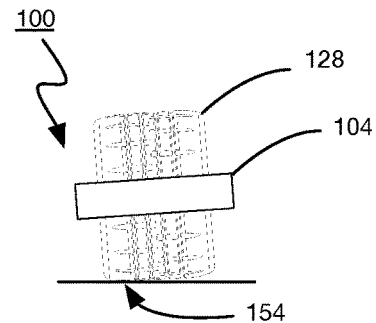
FIG. 8C shown a lateral orientation of the single wheel, self-balancing board at line 8C-8C in FIG. 7.
Figure 8B:
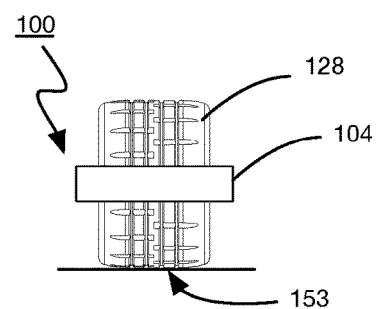
FIG. 8B shown a lateral orientation of the single wheel, self-balancing board at line 8B-8B in FIG. 7.
Figure 8A:
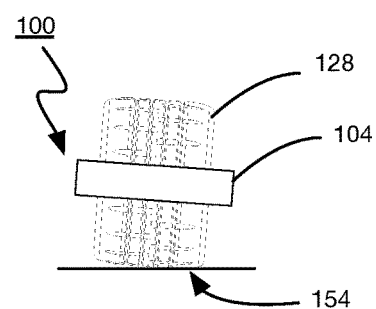
FIG. 8A shown a lateral orientation of the single wheel, self-balancing board at line 8A-8A in FIG. 7.

FIG. 8A shows the lateral orientation of the single wheel, self-balancing vehicle 100 at line 8A-8A in FIG. 7. At this point along the travel path 200, the single wheel, self-balancing vehicle 100 is to the left of the center of mass 204 of the rider. That is, the rider's weight is shifted to the right side of the platform 104. As a result, the platform 104 is laterally tilted so that the tire 128 is in contact with the travel surface along a portion of the lateral region 154 closest the center of mass 204 of the rider. As the lateral region 154 is somewhat frustoconical, the single wheel, self-balancing vehicle 100 veers to the right.

FIG. 8B shows the lateral orientation of the single wheel, self-balancing vehicle 100 at line 8B-8B in FIG. 7. At this point along the travel path 200, the single wheel, self-balancing vehicle 100 is under the center of mass 204 of the rider. Here, the rider is distributing weight generally evenly laterally across the platform 104. As a result, the platform 104 is level horizontally so that the central region 153 is in contact with the travel surface. The single wheel, self-balancing vehicle 100, however, traveling in a direction that varies from the direction that the rider's center of mass is traveling.

FIG. 8C shows the lateral orientation of the single wheel, self-balancing vehicle 100 at line 8C-8C in FIG. 7. At this point along the travel path 200, the single wheel, self-balancing vehicle 100 is to the right of the center of mass 204 of the rider. That is, the rider's weight is shifted to the left side of the platform 104. As a result, the platform 104 is laterally tilted so that the tire 128 is in contact with the travel surface along a portion of the lateral region 154 closest the center of mass 204 of the rider. As the lateral region 154 is slightly frustoconical, the single wheel, self-balancing vehicle 100 veers to the left.

As will be appreciated, the single wheel, self-balancing vehicle 100 transitions through direction changes smoothly.

While, in the above-described embodiment, the tire has a central region, it will be appreciated that a tire can be made without a central region in other embodiments, with the lateral regions abutting each other along a central circumference line.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A single wheel, self-balancing vehicle, comprising:
   a platform for supporting a standing rider; and
   a motorized wheel assembly that is rotationally coupled to the platform and is powered to transport a rider standing on the platform along a ground surface, wherein the motorized wheel assembly includes a tire that has a tire body with a tread configured for engagement with the ground surface,
   wherein the tread has a lateral profile having a central region, a first lateral region tapering towards a first lateral side of the tire, and a second lateral region tapering towards a second lateral side of the tire, wherein the lateral profile is substantially free of discontinuity, wherein, when the platform and the ground surface are level horizontally, a contact patch between the tire and the travel surface extends along a width of the central region,
   the tread having a tread groove arrangement that is asymmetrical about a central circumference line of the tire,
   the tire having a hardness selected to substantially prevent deformation of the first profile and the second profile during riding by a rider,
   wherein the tread groove arrangement comprises a first pattern of grooves on a first side of and adjacent the central circumference line and a second pattern of grooves on a second side of and adjacent the central circumference line,
   wherein the first pattern of grooves includes a plurality of first lateral grooves each of which extends from the central circumference line continuously laterally through the central region into the first lateral region,
   wherein the second pattern of grooves includes a plurality of second lateral grooves each of which extends from the central circumference line continuously laterally through the central region into the first lateral region, and
   wherein the first lateral grooves are circumferentially off-phase from the second lateral grooves.

2. A vehicle according to claim 1, wherein the tread groove arrangement comprises at least one circumferential groove.

3. A vehicle according to claim 2, wherein the plurality of first lateral grooves, the plurality of second lateral grooves and the at least one circumferential groove make up the entirety of the tread groove arrangement.

4. A vehicle according to claim 2, wherein each of the at least one circumferential groove in the tread groove arrangement is spaced from the central circumferential line.

5. A vehicle according to claim 1, wherein the central region of the lateral profile is generally flat.

6. A vehicle according to claim 5, wherein the central region has a width of at least 25 percent of a lateral width of the tread.

7. A vehicle according to claim 6, wherein the central region has a width of at most 40 percent of a lateral width of the tread.

8. A vehicle according to claim 1, wherein the tire is solid.

9. A vehicle according to claim 8, wherein the tire has a hardness of at least about Shore 56 A.

* * * * *